United States Patent
Hogsette, Jr. et al.

(10) Patent No.: US 9,387,921 B1
(45) Date of Patent: Jul. 12, 2016

(54) SELF CLOSING NET DOOR FOR AIRCRAFT

(71) Applicants: The United States of America, as Represented by the Secretary of Agriculture, Washington, DC (US); Kurt B. Jordan, Atlanta, GA (US)

(72) Inventors: Jerome A. Hogsette, Jr., Gainesville, FL (US); Kurt B. Jordan, Atlanta, GA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 14/206,647

(22) Filed: Mar. 12, 2014

Related U.S. Application Data

(60) Provisional application No. 61/779,622, filed on Mar. 13, 2013.

(51) Int. Cl.
*B64C 1/14* (2006.01)

(52) U.S. Cl.
CPC ..................................... *B64C 1/1461* (2013.01)

(58) Field of Classification Search
None
See application file for complete search history.

(56) References Cited

U.S. PATENT DOCUMENTS

| | | | | |
|---|---|---|---|---|
| 3,782,399 A * | 1/1974 | Milner | ........................... | 135/117 |
| 3,827,019 A * | 7/1974 | Serbu | ........................... | 335/285 |
| 4,662,809 A * | 5/1987 | Sturtz et al. | ................... | 414/347 |
| 5,039,050 A * | 8/1991 | Eidschun et al. | ........... | 248/279.1 |
| 5,197,503 A * | 3/1993 | Chen | ........................... | 135/88.07 |
| 5,323,835 A * | 6/1994 | Bachmeier | ....................... | 160/89 |
| 5,427,169 A * | 6/1995 | Saulters | ...................... | 160/368.1 |
| 5,597,028 A * | 1/1997 | Rolf et al. | ...................... | 160/354 |
| 5,738,130 A * | 4/1998 | Thomas | ...................... | 135/88.13 |
| 6,098,260 A * | 8/2000 | Sarh | ........................... | 29/243.53 |
| 6,145,573 A * | 11/2000 | Chen | ........................... | 160/368.1 |
| 7,108,005 B1 * | 9/2006 | Christenson et al. | ....... | 135/88.13 |
| 8,662,298 B2 * | 3/2014 | Aldana et al. | .................. | 206/320 |
| 2002/0179132 A1 * | 12/2002 | Gutierrez | ....................... | 135/117 |
| 2005/0011547 A1 * | 1/2005 | Herndon et al. | ............ | 135/88.07 |
| 2005/0230067 A1 * | 10/2005 | Jordan et al. | ................... | 160/330 |
| 2009/0139562 A1 * | 6/2009 | Thomas | ........................ | 136/245 |
| 2010/0186792 A1 * | 7/2010 | Imhof | ............................ | 135/121 |
| 2011/0083369 A1 * | 4/2011 | Hughes et al. | ..................... | 49/70 |
| 2014/0077520 A1 * | 3/2014 | McManus | ..................... | 296/97.3 |
| 2014/0174675 A1 * | 6/2014 | Updyke | ......................... | 160/108 |

\* cited by examiner

*Primary Examiner* — Medhat Badawi

(74) *Attorney, Agent, or Firm* — John D. Fado; Robert D. Jones

(57) ABSTRACT

The self closing aircraft door includes two overlapping door panels and is attached to an outer skin of the aircraft by a plurality of suction cups. Each of the door panels comprises a net material at least partially surrounded by a flexible frame. Each of the panels also includes essentially parallel connecting rods comprising a plurality of magnetic and non-magnetic segments. The door is structured so that in the closed position, the magnetic segments in the connecting rods of the two panels join and thereby create a physical barrier to insects which might otherwise enter the aircraft cabin.

16 Claims, 2 Drawing Sheets

SELF CLOSING NET DOOR FOR AIRCRAFT

REFERENCE TO RELATED APPLICATIONS

This application claims the benefit of U.S. Provisional Application No. 61/779,622 filed Mar. 13, 2013, which is incorporated herein by reference in its entirety.

FIELD OF THE INVENTION

The disclosed apparatus relates to a self closing door for aircraft. Specifically, the apparatus described herein relates to a net door designed to fit on the convex outer surface of an aircraft and thereby prevent the entry of insects into the cabin of the aircraft.

BACKGROUND OF THE INVENTION

As the number of (particularly international) flights increase, there is a corresponding increase in the danger of contaminating vulnerable human and agricultural environments with invasive insects. Invasive insects can have devastating consequences for the agricultural production of the affected environments. For example, the brown marmorated stink bug (*Halyomorpha halys*) continues to cause considerable damage to United States (US) East Coast apple, peach, and grape crops. For example, apple growers in the US Mid-Atlantic region reported nearly $40 million in crop damage from the insect.

Other invasive insects spread disease among humans and animals. For example, a variety of mosquitoes spread a wide range of dangerous diseases including malaria, dengue fever, west nile virus, and yellow fever. International air travel is thought to be one reason why the Asian tiger mosquito (*Aedes albopictus*) has become so firmly established on the US East Coast and in many non-native locations around the world.

The airline industry, in general, has been slow to address the problem. Some airlines apply a variety of aerosol insecticides to try to "disinsect" aircraft interiors. Airlines also have entire aircraft treated at regular intervals with contact residual insecticides, including seats and carpets in passenger cabins. However, the use of insecticides is problematic because some members of the public are sensitive to the chemicals used in the insecticides. The problem is compounded because the chemical odor associated with the aerosols detracts from the otherwise desirable environment inside the cabin and further exacerbates the problem of public sensitivity, particularly among senior citizens, infants, and the immunocompromised. Flight crews who repeatedly spend extended amounts of time in the aircraft are also impacted and may suffer negative effects from exposure to the chemicals in the insecticides.

There is also some use of "air curtain" equipment, which prevents entry of insects into aircraft while passengers are embarking or disembarking. Any insects attempting to fly into the aircraft must overcome the substantial machine-generated air flow across the aircraft cabin door used for passenger entry.

Although the "air curtain" provides some contamination protection, the air curtain cannot provide an actually physical barrier, and installation of air curtain machinery for all aircraft doors may not be possible or practical. Further, the non-uniform design of aircraft doorways may negatively impact the effectiveness of some air curtain machinery.

The need exists for a means of minimizing the vulnerability of aircraft cabins to contamination by damaging and disease-causing insects, particularly while aircraft are on the ground with cabin doors open. The apparatus described herein comprises a self closing door that attaches easily to the exterior of essentially all aircraft and provides a physical barrier to the entry of insects into the cabin. The current door apparatus is inexpensive and versatile, and can be used either alone, or in combination with current conventional insect exclusion techniques and devices.

SUMMARY OF THE INVENTION

This disclosure is directed to a self closing aircraft door comprising essentially mirror image first and second door panels. Each of the door panels comprises a net screening material surrounded by a flexible frame. A plurality of suction cups are attached to and positioned along at least one side of the net material or flexible frame. A pair of essentially parallel connecting rods is also positioned along one side of the net material or flexible frame. Each one of the connecting rods comprises magnetic and non-magnetic segments.

The door is structured so that as the suction cups hold the first and the second door panels to the aircraft, the magnetic segments in the two parallel connecting rods in the first door panel, connect with the magnetic segments in the two parallel connecting rods in second door panel, to thereby create the self closing aircraft door apparatus.

DETAILED DESCRIPTION OF PREFERRED EMBODIMENTS

Figure 1:
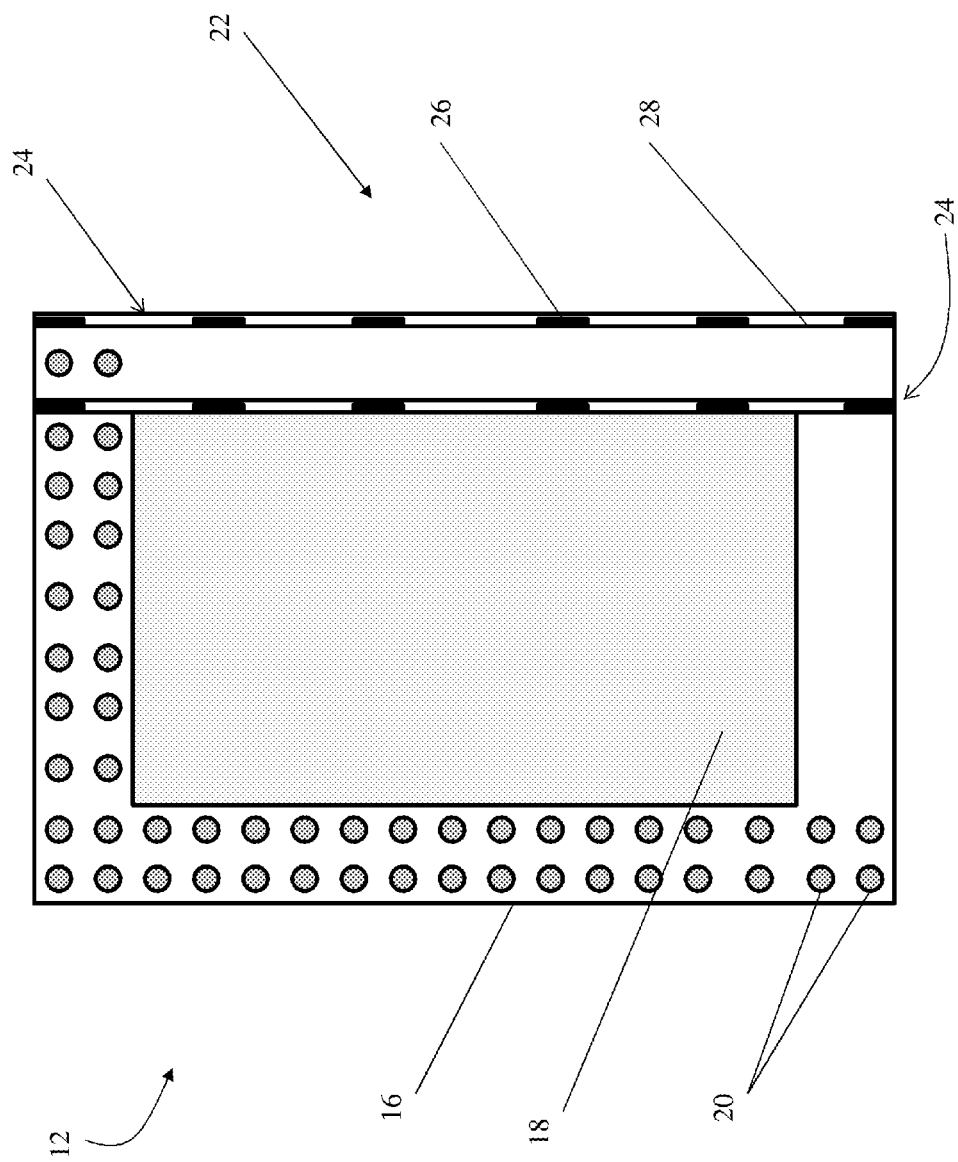
FIG. 1 is a view of a single panel of the self closing door.
Figure 2:
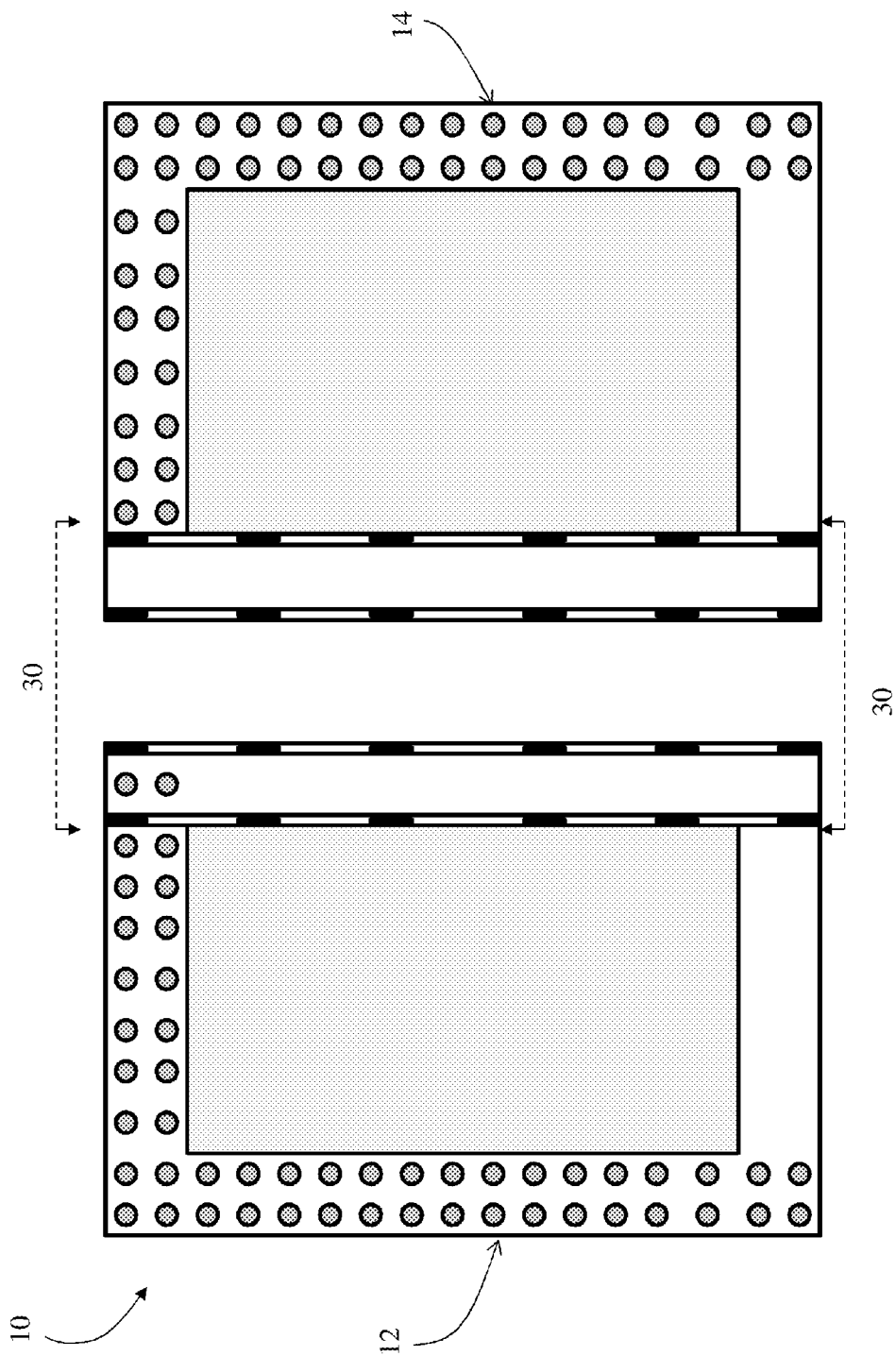
FIG. 2 is a view of the two panels that comprise the self closing door.

As generally shown in FIGS. 1 and 2, the self closing door apparatus 10 comprises a first panel 12 and a mirror-image second panel 14.

As best shown in FIG. 1, in the preferred embodiment, the first panel 12 includes a 4-6 inch flexible vinyl frame 16 that has a generally rectangular shape. The frame 16 surrounds a heavy weight mosquito net-type mesh 18, with a 2-inch webbing. The webbing is sewn into the vinyl frame 16 to create a durable and flexible panel 12.

In alternative embodiments, the door apparatus 10 and individual panels 12 and 14 can have a variety of shapes, as required by the type of aircraft door way in which the apparatus 10 will be applied. The frame 16 can be comprised of a variety of flexible, semi-flexible, and rigid materials consistent with the function of providing a door-type barrier to be positioned on a convex aircraft skin. In at least one embodiment, the outer edge of the net 18 may (or may not) comprise the frame 16. The net 18 may be comprised of a variety of materials including cloth, wire, plastic and composite materials. The material comprising the net 18 may also comprise insecticide-impregnated fibers.

As generally shown in FIGS. 1 and 2, the frame 16 may further comprise a plurality of aircraft skin attachment devices 20 specifically designed to adhere the panels 12, 14 to the skin of the aircraft. In the preferred embodiment, the attachment devices 20 may comprise suction cups 20 designed to adhere to aluminum or composite aircraft skin. The spacing and specific configuration of the suction cups 20 is generally a function of the size of the individual panels 12, 14 and the nature of the aircraft skin.

The design of the panel connection devices 20 is particularly critical, inventive, and non-obvious for a variety of reasons. It is crucial that the connection devices 20 attach to the outer skin of the aircraft and create a strong but non-abrasive bond. The aircraft skin is comprised of a non-magnetic convex surface that is somewhat vulnerable to abrasion. Even small abrasions to the skin of the aircraft may provide an avenue for corrosion and cabin pressure (air) leaks as well as the entry of moisture into sensitive electrical and/or hydraulic component areas.

Clamps or other mechanical connectors can damage the aircraft skin. A variety of connection mechanisms such as eyelets, sockets, cleats and the like could effectively secure the door, but these connectors require special modification of the aircraft skin and may detrimentally affect aircraft aerodynamics. Some chemical adhesives may be effective and non-abrasive, but removal can damage aircraft paint and can be ineffective if the aircraft skin is dusty or wet.

The design of the door attachment devices 20 disclosed herein enables the panels 12, 14 to be quickly and easily installed or removed from a wide variety of aircraft hulls, by a single person, without special tools or training, and in inclement weather conditions. The combination of the flexible door apparatus 10, and the suction cup design of the door attachment devices 20 comprises a significant and non-obvious contribution to the art.

As best shown in FIG. 1, the edge of the panel frame 16 opposite the aircraft skin attachment devices 20 comprises the self closing assembly 22. The self closing assembly 22 comprises two essentially identical parallel elongated connecting rods 24. Each of the connecting rods 24 comprises alternating sections of magnet 26 and rigid (preferably fiberglass) cylinders 28. In the preferred embodiment, the rods 24 are essentially semi-rigid and unitary, and the magnets comprise neodymium magnets.

Significantly, when the door attachment devices 20 are connected to the host aircraft skin, the panels 12 14 (in combination with the flexible rods 24) are bowed outwardly and formed into a convex shape that mimics and conforms to the shape of the host aircraft body. Specifically, the reversibly flexible (i.e. elastically bendable) nature and construction of the door frame 16 and the connecting rods 24 enables the apparatus 10 to accommodate a wide variety of aircraft fuselage configurations without permanent modification to the apparatus 10 components. This is a somewhat unexpected (and advantageous) result that improves the performance of the door apparatus 10. The convex shape of the door causes the bottom portion of the panels 12, 14 to form a better closure/seal with the bottom of the aircraft door opening. In prior art net doors which vertically hang straight down, at least a portion of the cabin floor adjacent to the aircraft doorway is exposed. This exposed gap creates a space where small insects (such as fruit flies, beetles, and mosquitoes) can be concealed and go undetected in the carpet and crevices adjacent to the door.

In alternative embodiments, the rods 24 may be comprised of materials other than fiberglass. The magnets 26 may be comprised of any magnetic material known in the art. Further, magnets 26 may be present only on one side of a panel (for example 12) at a designated position, while the corresponding panel (for example 14) position may comprise an attractive material (such as steel or iron) that may not be a (conventional) magnet. In the preferred and alternative embodiments the rods 24 and rod sections 26, 28 may have a cylindrical or non-cylindrical cross-sectional shape.

Although some prior art net doors include magnet closure devices, the prior art doors lack the double-fiberglass rod design or the suction cup attachment devices 20. The structure of the parallel fiberglass rods 28 (in combination with the magnets 26) results in a more stable door apparatus 10 that is less likely to gap open, and is more durable and effective than current conventional net doors. The fiberglass rods 28 also re-enforce and facilitate the vertical alignment of the magnets 26 on opposing door panels 12, 14, and ensure to ensure better closure/seal with the bottom portion of the aircraft door. Merely adding another row of magnets to an existing conventional net door does not achieve the same consistency of operational performance as the apparatus 10 described herein. Further, as discussed supra, the flexibility of the door components enables the door panels 12, 14 to conform to a wide variety of aircraft fuselage outer contours.

In operation, as best shown in FIG. 2, the door apparatus 10 is positioned in the doorway of an aircraft so that a first panel 12 is on one side of the aircraft doorway, and a second panel 14 is on the opposite side of the doorway. The door apparatus 10 is positioned so that suction cups 20 (FIG. 1) adhere to the outer convex skin of the aircraft, and thereby hold the apparatus 10 in position on the aircraft. The panels 12, 14 are positioned so that the areas designated by the dashed line 30 form an overlap area (FIG. 2). In the overlapping area 30, the connecting rod 24 magnets 26 (FIG. 1) on each of the panels 12, 14 adhere to corresponding magnets 26 on the opposite panel 12, 14, so that the magnets 26 in combination with fiberglass supporting segments 28 form the self-closing portion 22 of door apparatus 10 (FIG. 1).

As personnel approach the aircraft doorway, they part the panels 12, 14 and proceed through the door apparatus 10 and into or out of the cabin. After they move away from the aircraft door area and break contact with the apparatus 10, the self closing portion 22 of the apparatus 10 causes the magnets 26 on the panels 12, 14 to rejoin and thereby re-close the door 10.

For the foregoing reasons, it is clear that the apparatus described herein provides an innovative, and versatile self closing net aircraft door. The current system may be modified in multiple ways and applied in various technological applications. The disclosed method and apparatus may be modified and customized as required by a specific operation or application, and the individual components may be modified and defined, as required, to achieve the desired result.

Although some of the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

What is claimed is:

1. A self closing aircraft door apparatus comprising first and second door panels, each of the door panels comprising:
   a net screening material;
   a flexible frame at least partially surrounding the screening material;
   a plurality of suction cups attached to and positioned along at least one outer side of the net material or flexible frame; and
   a pair of essentially parallel connecting rods comprising semi-rigid and unitary rods positioned along one side of each of the door panels so that in an installed position, the four connecting rods are disposed between the first and second door panels, each of the connecting rods comprising connecting segments, the aircraft door apparatus being configured so that when the connecting segments are joined, the door panels are bowed outwardly to conform to a convex shape of an aircraft fuselage and join the fuselage at the bottom of the door;

the apparatus is structured so that as the suction cups hold the first and the second door panels to the aircraft, the connecting segments in the two parallel connecting rods in the first door panel, connect with the connecting segments in the two parallel connecting rods in second door panel to create the self closing aircraft door apparatus.

2. The apparatus of claim 1 wherein the net screening material comprises a cloth mosquito net.

3. The apparatus of claim 1 wherein the net screening material comprises a wire matrix.

4. The apparatus of claim 1 wherein the flexible frame comprises elongated rods.

5. The apparatus of claim 4 wherein the rods are comprised of one or a combination of fiberglass, plastic, wood, metal, composite material.

6. The apparatus of claim 1 wherein the suction cups are essentially circular and comprised of rubber.

7. The apparatus of claim 1 wherein the suction cups are deployed in essentially two parallel rows.

8. The apparatus of claim 1 wherein the suction cups are further positioned along at least two sides of the net material or flexible frame.

9. The apparatus of claim 1 wherein, when the self closing door apparatus is positioned over an aircraft door, the suction cups are arranged above the door and on the sides of the door.

10. The apparatus of claim 9 wherein no suction cups are positioned below the aircraft door.

11. The apparatus of claim 1 wherein at least one of the connecting segments in the first door panel is magnetic, and at least one of the connecting segments in the second door panel is one of metal or magnetic.

12. The apparatus of claim 1 wherein at least some of the connecting segments in both the first and second door panels are magnetic.

13. The apparatus of claim 1 wherein the first or the second door panel comprises at least one nonmagnetic segment.

14. The apparatus of claim 1 wherein both the first and the second door panels comprise magnetic and nonmagnetic segments.

15. A method of preventing insects from entering an aircraft, the method comprising
deploying the self closing door apparatus of claim 1 over an aircraft door.

16. A self closing aircraft door apparatus comprising at least two door panels, a pair of essentially parallel connecting rods comprising:
a net screening material;
a flexible frame at least partially surrounding the screening material;
a plurality of suction cups attached to and positioned along at least one outer side of the net material or flexible frame; and
semi-rigid and unitary rods positioned along one side of each of the door panels so that in an installed position, the four connecting rods are disposed between the first and second door panels, each of the connecting rods comprising connecting segments, the aircraft door apparatus being configured so that when the connecting segments are joined, the door panels are bowed outwardly to conform to a convex shape of an aircraft fuselage and join the fuselage at the bottom of the door;
the apparatus is structured so that as the suction cups hold the first and the second door panels to the aircraft, the connecting segments in the two parallel connecting rods in the first door panel, connect with the connecting segments in the two parallel connecting rods in second door panel to create the self closing aircraft door apparatus.

* * * * *